(12) United States Patent
De' Longhi et al.

(10) Patent No.: US 11,510,523 B2
(45) Date of Patent: Nov. 29, 2022

(54) AUTONOMOUS APPARATUS FOR COOKING FOOD, AND COOKING METHOD

(71) Applicant: DE' LONGHI APPLIANCES S.R.L. CON UNICO SOCIO, Treviso (IT)

(72) Inventors: Giuseppe De' Longhi, Treviso (IT); Renzo Mazzon, Silea (IT); Luca Gallina, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 427 days.

(21) Appl. No.: 16/652,004

(22) PCT Filed: Sep. 27, 2018

(86) PCT No.: PCT/IT2018/050177
§ 371 (c)(1),
(2) Date: Mar. 27, 2020

(87) PCT Pub. No.: WO2019/064319
PCT Pub. Date: Apr. 4, 2019

(65) Prior Publication Data
US 2020/0260909 A1 Aug. 20, 2020

(30) Foreign Application Priority Data
Sep. 27, 2017 (IT) .................. 102017000108342

(51) Int. Cl.
*A47J 37/06* (2006.01)
*A47J 43/046* (2006.01)
*A47J 43/07* (2006.01)

(52) U.S. Cl.
CPC ......... *A47J 37/0641* (2013.01); *A47J 43/046* (2013.01); *A47J 43/0722* (2013.01)

(58) Field of Classification Search
CPC .. A47J 37/0842; A47J 37/0641; A47J 43/046; A47J 43/0722; B01F 35/95
(Continued)

(56) References Cited

U.S. PATENT DOCUMENTS

| 2008/0213447 A1 | 9/2008 | Payen et al. |
| 2011/0048246 A1 | 3/2011 | Chang |
| 2021/0169275 A1* | 6/2021 | Plazarte .............. B01F 27/2322 |

FOREIGN PATENT DOCUMENTS

| CN | 203609187 U | 5/2014 | |
| EP | 3912527 A4 * | 11/2021 | ............ A47J 36/165 |
| WO | WO-2014/068225 A1 | 5/2014 | |

OTHER PUBLICATIONS

Machine tranlsation of CN203609187U, accessed via https://worldwide.espacenet.com/ on Jul. 21, 2022.*
(Continued)

*Primary Examiner* — Marc C Howell
(74) *Attorney, Agent, or Firm* — Marshall, Gerstein & Borun LLP

(57) ABSTRACT

An autonomous cooking apparatus for food includes a base body, a lid defining with the base body a cooking chamber, a container, disposed in the base body and a mixing device. The mixing device is connected to a drive member configured to make it rotate with respect to the container around a central axis of rotation. The apparatus also comprises a heating device configured to heat air in the cooking chamber and a ventilation device configured to make the air circulate.

14 Claims, 2 Drawing Sheets

(58) Field of Classification Search
USPC .......................................... 219/400; 99/348
See application file for complete search history.

(56) References Cited

OTHER PUBLICATIONS

International Search Report and Written Opinion for PCT/IT2018/050177, dated Jan. 4, 2019.

* cited by examiner

AUTONOMOUS APPARATUS FOR COOKING FOOD, AND COOKING METHOD

FIELD OF THE INVENTION

The present invention concerns an autonomous apparatus for cooking food comprising a cooking chamber defined by a base body and a lid which can be opened/closed with respect to the base body and a container for food disposed in the cooking chamber. The autonomous apparatus also comprises an air ventilation device that cooperates with a heating device to heat the air in the cooking chamber and convey it toward the food in order to cook it.

The present invention also concerns a method for cooking food.

BACKGROUND OF THE INVENTION

In the domestic environment, autonomous apparatuses are known for cooking food, comprising a base body, suitable to contain and position an internal container, open at the top, in which the food to be cooked is introduced.

The base body is associated with a closing/opening lid and defines together with it a cooking chamber having a controlled atmosphere suitable for the cooking to be performed.

The controlled atmosphere is generated by the cooperation between a heating device, which generates thermal energy suitable to heat the air, and a ventilation device which directs the air heated by the heating device toward the food.

In known apparatuses, the ventilation device sucks the air from the cooking chamber and, after possibly making it pass in correspondence with the heating device, makes it circulate again in the cooking chamber, so that it affects the upper surface of the food.

The surfaces of the food directly hit by the hot air can therefore also possibly dry out more than the underlying zones, resulting in an uneven cooking of the food, and possibly even a non-homogeneous consistency.

Autonomous cooking apparatuses are also known which comprise a mixing element disposed inside the container, wherein the mixing element and the container move reciprocally so as to mix the food while the air is conveyed thereon normally from above.

One disadvantage of the known type of apparatus is that they do not allow uniform cooking of the food, since the hot air only partly hits it directly, while the food disposed on the bottom of the container, if not adequately moved by the mixing device, receives heat only through contact with the surrounding food.

It is therefore often necessary to provide additional heating devices positioned in correspondence with the bottom of the container to provide the appropriate heat input to the food, or to extend the cooking time with additional costs.

Another disadvantage of known apparatuses is also that, at least in the initial steps, part of the heat of the heated air is dispersed inside the cooking chamber before it reaches the food. This can entail a waste of energy on the one hand and longer cooking times on the other.

Cooking apparatuses for food are known from US-A-2008/213447, US-A-2011/0482246, WO-A-2014/068225 and CN-U-203 609 187, comprising a cooking chamber suitable to contain food and an air ventilation device that cooperates with a heating device to heat the air in the cooking chamber and convey it toward the food in order to cook it.

One purpose of the present invention is to provide an autonomous cooking apparatus which is better than known apparatuses in terms of uniformity and homogeneity of cooking.

Another purpose of the present invention is to provide an autonomous cooking apparatus which is efficient in terms of cooking the food and which, at the same time, allows to reduce overall energy consumption.

Another purpose of the present invention is to provide an autonomous cooking apparatus which allows to reduce the times generally necessary for cooking the food.

Another purpose of the present invention is to provide an autonomous cooking apparatus that is constructively simple and easy to clean, and allows maintenance operations to be carried out easily.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, an autonomous cooking apparatus for food comprises a base body and a lid, which can be opened, or removed, and can be closed, or put in a closing position with respect to the base body, and defining with the latter a cooking chamber. The autonomous apparatus also comprises a container suitable to contain the food to be cooked and a mixing device disposed in the container and connected to a drive member configured to make it rotate with respect to the latter around a central axis of rotation in order to mix the food.

The autonomous apparatus according to the invention provides in particular to cook the food using a heating device as a means to transfer the hot air heated by the heating device and made to circulate by means of a ventilation device.

According to some embodiments of the invention, at least the heating device is suitable to directly deliver jets of hot air onto the mixing surface, which directly impact on the food during the mixing step, so that the heated air reaches the food during movement while the food is being mixed by the mixing device itself.

This means that, during the mixing step, the food is directly hit by the hot air for a long period, as well as being in direct contact with the hot mixing device, which is also heated by the hot air in transit.

According to some embodiments of the invention, the mixing device is provided with means to receive the hot air along the central axis of rotation, comprising an entrance aperture, and exit means of the hot air associated with the mixing surface.

According to some embodiments, the autonomous apparatus also comprises a device to convey the hot air, disposed between the ventilation device and the mixing device and configured to convey the heated air into the mixing device through the entrance aperture.

According to some embodiments, the conveying device can be the detachable type and can have either a round section or a flattened or shaped section, suitable to improve both the air flow and also the mixing.

The action of the ventilation device, combined with the conveying device, therefore forces the hot air into cooperation with the mixing device, so that, exiting from suitable exit apertures, the hot air directly and immediately impacts on the food at the same moment in which the food is made to move by the action of the mixing device.

The fact that the hot air does not transit first in the cooking chamber allows to increase the supply of heat in the food and to involve the latter for a longer time with the hot air directed onto it while it is subjected to mixing, and only during mixing.

This allows to act on the food with a desired temperature for a specific time, followed by a period during which the food distributes and the heat received and makes it uniform.

In fact, since the hot air tends in any case to rise toward the upper part of the cooking chamber, the fact that it is introduced from below and that it impacts first on the food means that it performs its heating and cooking function in direct contact with the food and nowhere else.

According to some embodiments, the mixing device comprises a hub which functions as a rotating air distributor, and at least one mixing blade, integrally connected to the hub, or detachable therefrom, and rotating together with it with respect to a cooking plane of the food container.

According to some embodiments, the hot air coming from above in a conveyed manner enters the hub and exits in cooperation with the mixing blade/blades.

The hub has a plurality of holes or slits in a suitable position, which allow the air to exit, in which at least some of the holes cooperate with the mixing blade/blades.

The cooperation can be of two different types.

According to a possible embodiment, the hot air enters inside the mixing blade and exits through the exit apertures made in its thickness, and possibly directed in a desired manner, impacting directly on the food sliding on the movement surface of the mixing blade.

According to a variant, in order to facilitate cleaning and maintenance operations, in cooperation with the mixing surface of the mixing blade which is anchored on it, the hub has a slit to transfer the hot air.

A lid, which can be removably applied on the surface of the mixing blade which impacts on the food, has means to receive the hot air, cooperating with the transfer slit of the hub, and conveying channels provided with distribution holes and slits which define the exit apertures in relation to the mixing surface.

The lid can be applied in snap-in or bayonet manner, or other, so as to be easily removable and easy to clean.

According to some embodiments of the invention, the air circuit provides that the air introduced into the food container exits peripherally between it and the base body, and that it is sucked by a ventilation device which delivers it again toward the conveyor in the form of hot air after it has been made to pass through the heating device.

According to possible variants, the air introduced into the food container can be made to circulate directly inside the cooking chamber.

According to some embodiments, it can be provided that the heating device is located downstream of the ventilation device along an air recirculation path.

According to variant embodiments, the heating device can be disposed upstream of the ventilation device.

The present invention also concerns a method for cooking food in an autonomous apparatus in which, in order to cook the food disposed in the container inside the cooking chamber, the method provides to convey the heated air from the heating device through the mixing device by means of a conveying device, introducing it through means for receiving hot air, and to deliver jets of air from a mixing surface of the mixing device toward the food to be cooked during the mixing of the latter.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
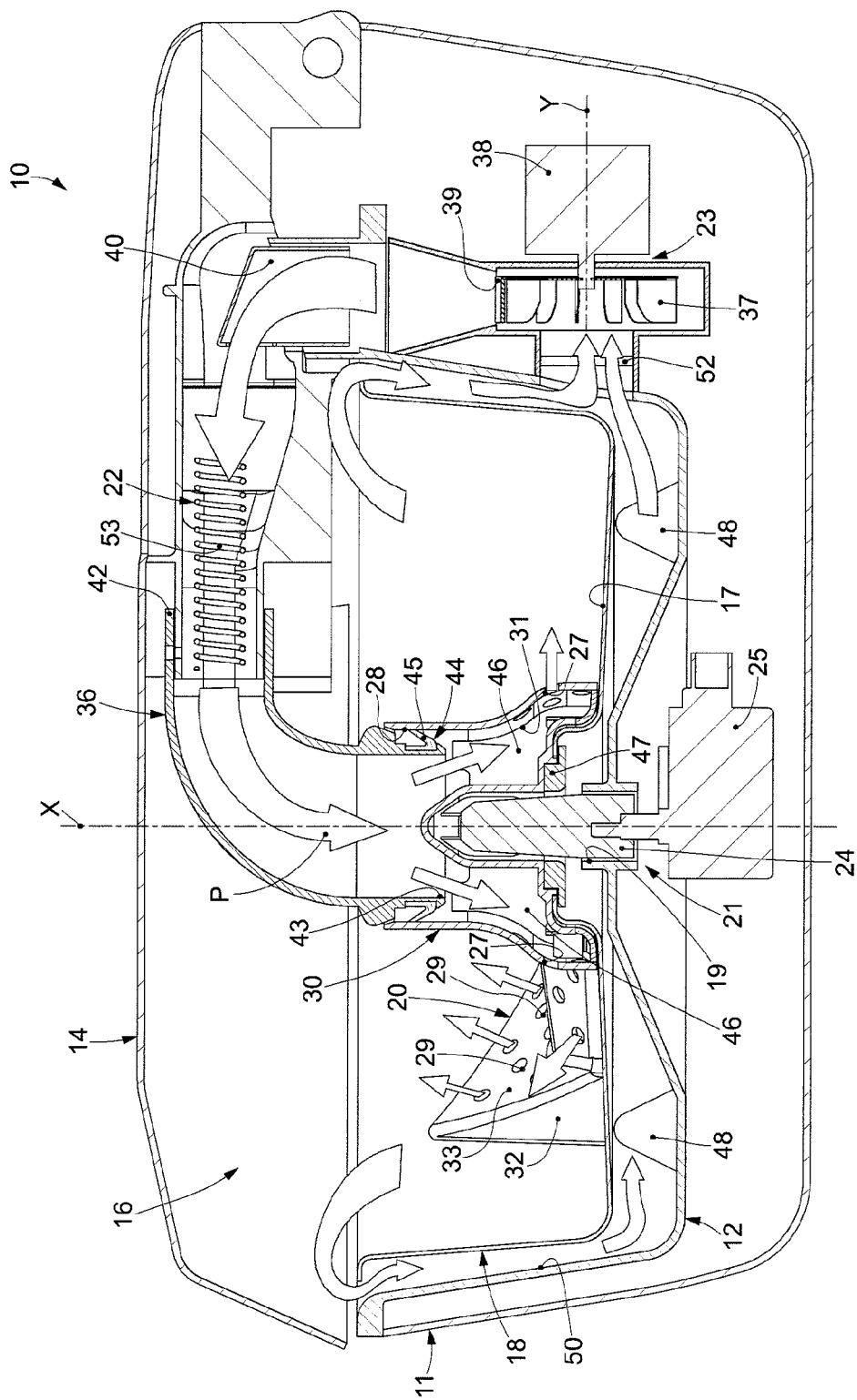
FIG. 1 is a schematic view in cross section of an autonomous cooking apparatus according to embodiments described here.

Embodiments described here concern an autonomous apparatus 10 for cooking food.

The autonomous apparatus 10 comprises a base body 12 and a lid 14 which can be opened/closed with respect to the base body 12, which, in the closed condition of the lid 14, define a cooking chamber 16.

The lid 14 can be of the type hinged to the base body 12, or it can be of the completely removable type and can be positioned in the closed position.

According to some embodiments, the autonomous apparatus 10 is provided with an external container 11, comprising two parts mobile with respect to each other, respectively associated with the base body 12 and the lid 14. The external container 11 encloses the base body 12 and the lid 14 and performs both an esthetic function and also a protective function, preventing a user from being burnt by coming into contact with internal zones of the autonomous apparatus 10 which can have high temperatures.

Inside the base body 12 a tub-like container 18 is provided in which the food to be cooked can be placed, and is provided with a cooking plane 17.

According to some embodiments, the container 18 is fixed with respect to the base body 12.

According to some embodiments, the container 18 can be removably attached to the base body 12 in such a way that it remains stable when the food is being cooked, but can be removed at the end of cooking to facilitate the removal of the food and the cleaning of the container 18.

The autonomous apparatus 10 also comprises a heating device 22 configured to heat the air which passes in contact with it to a temperature suitable to cook the food.

The apparatus 10 also comprises a ventilation device 23 configured to move the air inside the cooking chamber 16, which cooperates with the heating device 22 in such a way as to heat the air before directing it toward the food to be cooked.

According to some embodiments, the autonomous apparatus 10 also comprises a mixing device 20, rotatable with respect to the container 18 and configured to mix the food contained therein.

The mixing device 20 is made to rotate around a central axis of rotation X passing through the center of the container 18 by a drive member 21.

According to some embodiments, the container 18 can be disposed with its cooking plane 17 parallel to the base body 12.

According to variant embodiments, not shown, the container 18 can be inclined with respect to the base body 12, with the cooking plane 17 having a desired angle of inclination other than zero.

Depending on the position of the container 18 with respect to the base body 12, the central axis of rotation X can be substantially vertical, or be inclined respectively by the corresponding angle of inclination with respect to the vertical.

The drive member 21 comprises a drive shaft 24 which extends vertically along the central axis of rotation X inside the container 18 and a motor member 25 connected thereto and configured to make it rotate.

The drive shaft 24 can extend through a suitable hole 19 made in the cooking plane 17 of the container 18.

According to one aspect of the present invention, the mixing device 20 is suitable to receive hot air through reception means 28 and to deliver jets of hot air through exit means 27, 29, suitably shaped and/or directed, directly toward the food to be cooked.

According to some embodiments, the hot air reception means comprise at least one entrance aperture 28.

According to some embodiments of the present invention, the mixing device 20 comprises a hub 30, which functions as a rotating air distributor, and at least one mixing blade 32 integrally connected with the hub 30, or detachable therefrom, and rotatable together with it.

The hub 30 is connected coaxial to the drive shaft 24 and made to rotate by the latter around the central axis of rotation X.

According to some embodiments, the hub 30 can comprise a connection seating for the drive shaft 24. The hub 30 and the drive shaft 24 can be made integral with each other by same-shape coupling, or by suitable attachment members, in such a way that the rotation of the drive shaft 24 draws the hub 30 and the mixing blade 32 with it.

According to some embodiments, a support device 47 can be provided, keyed on the drive shaft 24 and suitable to support both the container 18 and the mixing device 20, so that the latter can rotate with respect to the former.

The support device 47 can be made with a shape and a material suitable to be inserted inside the hole 19 of the container in such a way as to function as a sealing element and prevent possible leakage of fluids through it.

According to some embodiments, it can be provided that the hub 30 and the at least one mixing blade 32 are made in a single body.

According to variant embodiments, it can be provided that the hub 30 and the at least one mixing blade 32 are made as separate bodies joined together by suitable connection members, so as to allow better cleaning of the components.

For example, it can be provided that the hub 30 and the mixing blade 32 are at least partly hollow and made at least partly communicating with each other, defining together an internal cavity 26 of the mixing device 20.

According to possible variants, two or more mixing blades 32 can be provided, for example, disposed at equal angles with respect to each other around the central axis of rotation X, depending on their shape, or size, or the type of food to be cooked.

According to some embodiments, the two or more mixing blades 32 can have different shapes and/or sizes from each other.

According to some embodiments, the hub 30 can have a cylindrical shape, like a truncated cone, or suchlike, closed at the bottom and having the entrance aperture 28 at the top.

According to some embodiments, the hub 30 comprises at least one through hole 27 or slit, communicating with a plurality of exit apertures 29, to allow the passage of the hot air coming from the entrance aperture 28.

According to some embodiments, in a suitable position the hub 30 has a plurality of through holes 27 or slits, of which one part cooperates with the exit apertures 29, and another part communicates directly with the food.

According to some embodiments, the exit apertures 29 are associated with at least one mixing surface 33 of the mixing blade 32.

Figure 2:
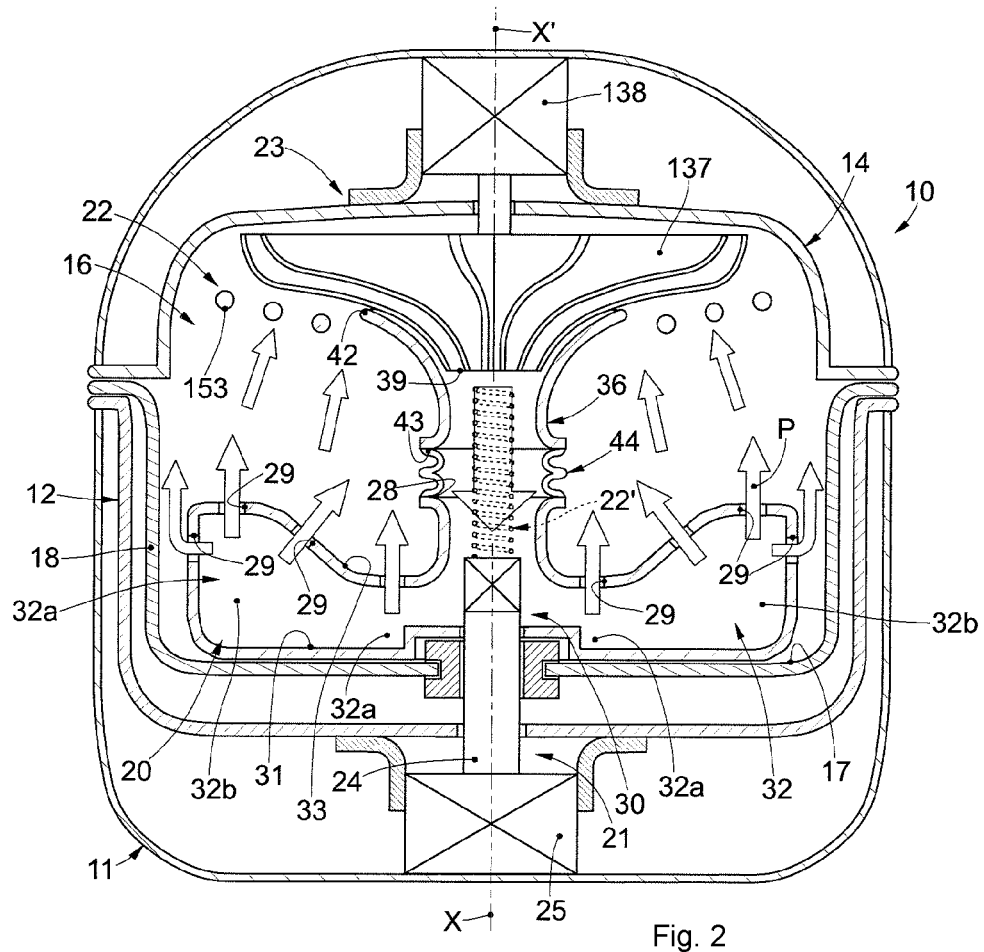
FIG. 2 is a schematic view in cross section of an autonomous cooking apparatus according to variant embodiments described here.
Figure 4:
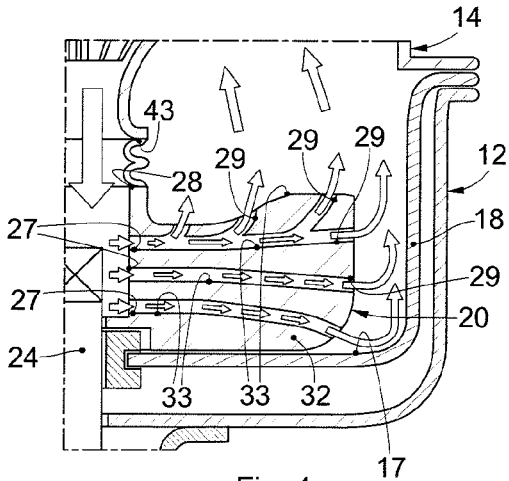
FIG. 4 is a schematic view of a detail of an autonomous apparatus according to other variants.

According to some embodiments, described for example with reference to FIGS. 1, 2 and 4, the mixing blade 32 is at least partly hollow between the at least one hole 27 and the exit apertures 29.

According to the embodiments shown by way of example in FIGS. 1 and 2, the mixing blade 32 can be completely hollow and the exit apertures 29 can be made directly in its thickness.

For example, exit apertures 29 can be provided made on an upper and/or lateral mixing surface 33 of the mixing blade 32 to optimize the supply of heat to the food.

According to variant embodiments, described for example with reference to FIG. 4, the mixing blade is partly hollow, and channels 35 are provided so that the hot air can flow between the at least one hole 27 of the hub 30 and the exit apertures 29.

Figure 3:
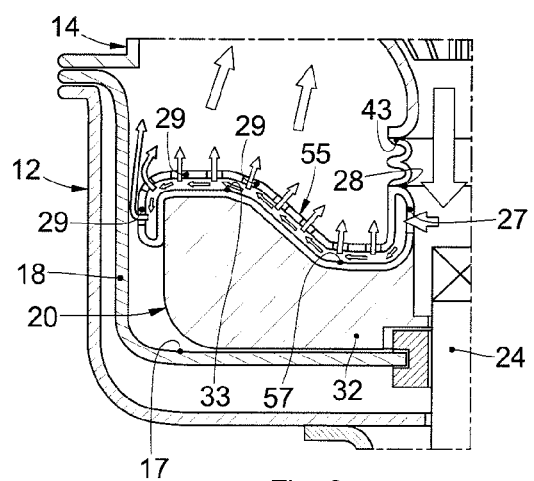
FIG. 3 is a schematic view of a detail of an autonomous apparatus according to other variants.

According to variant embodiments, described for example with reference to FIG. 3, a cover 55 can be provided which can be removably applied on the mixing surface 33 of the mixing blade 32.

According to this solution, the cover 55 has air reception means, which cooperate with the holes 27 of the hub 30, and conveying channels 57 provided with air distribution holes which define the exit apertures 29.

According to some embodiments, the mixing blade 32 can have a shape suitable to allow the food to be moved from the center of the container 18 toward the periphery thereof, or vice versa, so as to mix it uniformly.

For example, according to possible solutions, the mixing blade 32 can comprise an internal portion 32a to connect with the hub 30, with a substantially constant height, and an external portion 32b with a height that gradually increases from the center toward the periphery of the container 18.

According to some embodiments, the increasing development of the height of the external portion 32b is such as to define a concavity 33 suitable to receive the food, raising it with respect to the cooking plane 17.

According to other embodiments, however, the mixing blade 20 can have any shape suitable to mix the food.

According to some embodiments, at the lower part the hub 30 and/or the mixing blade 32 have a shape suitable to scrape at least the cooking plane 17 of the container 18, so as to ensure adequate mixing of the food contained therein.

According to other embodiments, the apparatus 10 comprises a device 36 to convey hot air, configured to convey the air heated by the heating device 22 into the mixing device 20.

In particular, the conveying device 36 connects an exit 39 of the ventilation device 23 with the entrance aperture 28 of the hub 30.

The conveying device 36 can be advantageously connected in a removable manner, so as to allow a complete cleaning of the autonomous apparatus 10.

According to some embodiments, the conveying device 36 has a tubular shape and has a first end 42 cooperating with the exit 39, and a second end 43 which cooperates with the entrance aperture 28 of the mixing device 20.

According to some embodiments, it can be provided that the second end 43 is partly inserted inside the entrance aperture 28 of the mixing device 20.

According to possible solutions, between the mixing device 20 and the second end 43, joining members 44 can be provided, suitable to allow the hub 30 to rotate with respect to the conveying channel 36.

According to possible embodiments, the joining members 44 can comprise a gasket 45 disposed between the external lateral surface of the conveying device 36 and the internal surface of the hub 30 which allows both a relative rotation of the two elements and also prevents the heated air introduced into the hub 30 to escape through the entrance aperture 28 itself.

In this way the heated air enters the hub 30 and comes out through the exit apertures 29 and/or the holes 27, impacting directly on the food to be cooked.

According to some embodiments, which can be combined with the embodiments described here, fins 46 can be provided in the compartment 31 inside the hub 30.

The fins 46 can each be disposed on a vertical plane, substantially parallel to the central axis of rotation X, and which develops radially with respect to it.

The fins 46 can function as a secondary ventilation device during the rotation of the mixing device 20, so as to increase the speed of the air emitted through the exit apertures 29.

In this way the air is introduced and distributed more effectively through the food.

According to some embodiments, in the compartment 31 of the hub 30 retention members can be provided, not shown, suitable to position and retain the fins 46 in an appropriate manner.

The air inside the cooking chamber 16 then follows an air path P, indicated by arrows in FIGS. 1-4, caused by the combined action of the ventilation device 23 and the conveying device 36.

According to some embodiments, it can be provided that the heating device 22 is positioned upstream of the ventilation device 23 along the air path P.

According to possible variants, the heating device 22 can be positioned downstream of the ventilation device 23 along the air path P.

According to the embodiment shown by way of example in FIG. 1, the ventilation device 23 can be disposed in a cavity of the base body 12 outside the cooking chamber 16 and in fluid communication with it.

According to these embodiments, the ventilation device 23 can comprise a centrifugal impeller 37 provided with a plurality of blades, and a motor member 38 connected thereto and configured to make it rotate around an axis of rotation Y, for example orthogonal to central axis of rotation X.

According to some embodiments, the centrifugal impeller 37 can be located in proximity to the bottom of the container 18, so as to improve the air suction effectiveness from the cooking chamber 16.

According to these embodiments, the centrifugal impeller 37 sucks the air axially in the direction of the axis of rotation Y and emits it radially with respect thereto.

The centrifugal impeller 37 can be positioned inside a recirculation channel 40 which at least partly defines the air path P toward the conveying device 36.

According to some embodiments, the heating device 22 is disposed along the recirculation channel 40.

According to other embodiments, it can be provided that the heating device 22 is positioned at least partly outside the recirculation channel 40, and is partly inserted into the conveying device 36.

According to possible solutions, the heating device 22 can comprise an electrical resistance 53, a coil having a plurality of spirals, for example in the shape of a helix, a finned heat exchanger suitable to supply a large heat exchange surface with the air passing through it, infrared or induction devices, or similar or comparable elements.

According to this embodiment, the air which, after passing through the food in contact with it, tends to rise upward in the cooking chamber 16 because of the suction of the ventilation device 23, and is forced to follow the air path P through a gap 50 defined between the container 18 and the base body 12 as far as the ventilation device 23.

According to the embodiments shown in FIG. 1, spacer elements 48 can be provided, disposed in the base body 12 and configured to keep the container 18 raised with respect to it, so as to allow the passage of air below the container 18.

Downstream of the ventilation device 23, the air is directed from the latter through the recirculation channel 40 toward the heating device 23 and the conveying device 36 until it passes through the mixing device 20 and reaches the food again.

According to other embodiments, a filter element 52, possibly replaceable, can be provided, disposed between the cooking chamber 16 and the ventilation device 23, suitable to retain possible particles of oil or fat coming from the food present in the cooking chamber 16.

FIG. 2 shows a possible variant embodiment of an autonomous apparatus 10 for cooking food, in which the elements common to the embodiment described with reference to FIG. 1 have the same reference numbers and will not be further discussed.

According to this variant, the ventilation device 23 can be disposed inside the cooking chamber 16, in proximity to the lid 14.

According to these embodiments, the ventilation device 23 can comprise an axial impeller 137 provided with a plurality of fins, and a motor member 138 configured to make the axial impeller 137 rotate around an axis of rotation X'.

During rotation, the axial impeller 137 sucks an air flow in the radial direction and emits it in the axial direction along the axis of rotation X' toward the conveying device 36.

In this case it can be provided that the first end 42 of the conveying device 36 has a flared mouth, of a shape suitable to at least partly follow the profile of the axial impeller 137 so that the air emitted by the latter is conveyed therein in an appropriate way.

According to some embodiments, the axis of rotation X' of the axial impeller 137 can be parallel to or coincide with the central axis of rotation X.

According to possible variants, for example if the container 18 is inclined, the axis of rotation X' of the axial impeller 137 and the central axis of rotation X of the mixing device 20 can be offset and angled with respect to one another.

In this case, it can be provided that the joining members 44 between the conveying device 36 and the mixing device 20 comprise elastic elements suitable to compensate the offset.

According to possible variant embodiments, the heating device 22 can comprise an electrical resistance 153, or a coil, with a spiral shape, with the spirals positioned so as to follow the profile of the axial impeller 137.

In this way the ventilation device 23 sucks in already heated air and sends it directly to the mixing device 20 by means of the conveying device 36.

According to other variant embodiments, shown with dotted lines in FIG. 2, the heating device 22' can be disposed inside the conveying device 36, downstream of the ventilation device 23.

According to other embodiments, two heating devices 22, 22' can be provided, one upstream and one downstream of the ventilation device 23.

According to these embodiments, the air is recirculated directly inside the cooking chamber 16, without deviating it outside it, exploiting its own physical characteristics.

In fact, the air, possibly mixed with steam, tends to rise from the container 18 toward the lid 14 and toward the upper part of the chamber 16, partly by natural convection and partly because it is subjected to the suction action of the ventilation device 23.

The ventilation device 23 in particular increases the recirculation speed of the air, which is heated on each occasion by means of the heating device 22 before being introduced into the mixing device 20, to exit through the exit apertures 29.

Embodiments described here also concern a method to cook food in an autonomous apparatus 10 comprising a base body 12, a lid 14 which can be opened/closed with respect to the base body 12, and defining with it a cooking chamber 16, a container 18 for the food disposed fixed inside the base body 12 and a mixing device 20 disposed in the container and rotatable with respect to the latter around a central axis X.

The cooking method according to the invention provides to heat air to a temperature suitable to cook the food by means of a heating device 22 and to make the heated hot air circulate toward the food to be cooked by means of a ventilation device 23.

According to one aspect of the present invention, the cooking method in particular provides to direct the heated air toward the food by making it pass through the mixing device 20 by introducing it through at least one entrance aperture 28, and making it exit through one or more holes 27 and/or exit apertures 29 directly toward the food to be cooked during the rotation of the mixing device 20.

It is clear that modifications and/or additions of parts can be made to the autonomous apparatus 10 and cooking method as described heretofore, without departing from the field and scope of the present invention.

It is also clear that, although the present invention has been described with reference to some specific examples, a person of skill in the art shall certainly be able to achieve many other equivalent forms of autonomous apparatus 10 and cooking method, having the characteristics as set forth in the claims and hence all coming within the field of protection defined thereby.

The invention claimed is:

1. An autonomous cooking apparatus for food comprising a base body, a lid defining with said base body a cooking chamber, a container, disposed in the base body and suitable to contain the food to be cooked, a mixing device, comprising at least a mixing blade suitable to cooperate with a cooking plane of said container, to mix said food, said mixing device being connected to a drive member configured to make it rotate with respect to said container around a central axis of rotation, a heating device configured to heat air in said cooking chamber to a desired temperature and a ventilation device configured to make the air circulate, wherein said mixing device is provided with means to receive the hot air along said central axis of rotation comprising an entrance aperture, and with exit means of the hot air comprising exit apertures associated with at least part of said mixing blade, wherein said autonomous apparatus comprises a conveying device disposed between said ventilation device and said means to receive the hot air.

2. The autonomous apparatus as in claim 1, wherein said mixing device comprises a hub rotating around said central axis of rotation to which said mixing blade is connected, wherein said hub is provided with at least one hole that cooperates with said exit apertures associated with said mixing blade.

3. The autonomous apparatus as in claim 2, wherein said hub comprises a plurality of holes, in which a first part of said holes is in fluidic communication with said exit apertures and a second part of said holes communicates directly with said cooking chamber.

4. The autonomous apparatus as in claim 2, wherein said mixing blade is at least partly hollow between said at least one hole and said exit apertures.

5. The autonomous apparatus as in claim 2, comprising a cover which can be removably applied to said mixing blade and provided with means for receiving the hot air cooperating with said at least one hole of the hub and with conveying channels of the hot air provided with holes defining said exit apertures and emerging onto a mixing surface of said mixing device.

6. The autonomous apparatus as in claim 2, comprising fins disposed vertically in an internal compartment of said hub and configured to act as a secondary ventilation device during the rotation of said mixing device.

7. The autonomous apparatus as in claim 1, wherein joining members are provided between said entrance aperture of said mixing device and said conveying device.

8. The autonomous apparatus as in claim 1, wherein said ventilation device is disposed in said base body laterally to said cooking chamber and is configured to make the air circulate from the cooking chamber toward the conveying device through a recirculation channel.

9. The autonomous apparatus as in claim 1, wherein said ventilation device is positioned in the upper part of the cooking chamber and is configured to make the air circulate from the cooking chamber directly into said conveying device.

10. The autonomous apparatus as in that claim 7, wherein said container is inclined with respect to said base body and said joining members comprise elastic elements suitable to compensate a possible misalignment between said central axis of rotation and an axis of rotation of said ventilation device.

11. The autonomous apparatus as in claim 1, wherein said heating device is located upstream of said ventilation device along an air recirculation path.

12. The autonomous apparatus as in claim 1, wherein said heating device is located downstream of said ventilation device along an air recirculation path.

13. The autonomous apparatus as in claim 12, wherein said heating device is located inside said conveying device.

14. A method for cooking food in an autonomous apparatus comprising a base body, a lid defining with said base body a cooking chamber, a heating device, a ventilation device a container, disposed in the base body and suitable to contain the food to be cooked, and a mixing device, comprising at least a mixing blade suitable to cooperate with a cooking plane of said container to mix the food, and connected to a drive member configured to make it rotate with respect to said container around a central axis of rotation, wherein said method provides to heat air to a temperature suitable for cooking the food by means of said heating device, and to make the hot air circulate toward the food to be cooked by means of said ventilation device, wherein, in order to make said hot air circulate toward the food, said cooking method provides to convey the hot air inside the mixing device along said central axis of rotation and to deliver said hot air toward the food at least from exit apertures provided in a mixing surface of said mixing device.

* * * * *